(12) United States Patent
Celebi et al.

(10) Patent No.: US 12,249,774 B2
(45) Date of Patent: Mar. 11, 2025

(54) DUAL BAND PLUG-ON TRANSMITTER ANTENNA

(71) Applicant: Shure Acquisition Holdings, Inc., Niles, IL (US)

(72) Inventors: Adem Celebi, Oak Park, IL (US); Mark Allen Kenkel, Schaumburg, IL (US); Tracy Wang, Suzhou (CN); Zhen Ma, Suzhou (CN)

(73) Assignee: Shure Acquisition Holdings, Inc., Niles, IL (US)

( * ) Notice: Subject to any disclaimer, the term of this patent is extended or adjusted under 35 U.S.C. 154(b) by 109 days.

(21) Appl. No.: 17/872,342

(22) Filed: Jul. 25, 2022

(65) Prior Publication Data

US 2024/0030604 A1    Jan. 25, 2024

(51) Int. Cl.
| | |
|---|---|
| *H01Q 1/22* | (2006.01) |
| *H01Q 5/48* | (2015.01) |
| *H04B 1/00* | (2006.01) |

(52) U.S. Cl.
CPC ............ *H01Q 5/48* (2015.01); *H01Q 1/2291* (2013.01); *H04B 1/0057* (2013.01)

(58) Field of Classification Search
CPC ....... H01Q 5/48; H01Q 1/2291; H04B 1/0057
See application file for complete search history.

(56) References Cited

U.S. PATENT DOCUMENTS

| | | | |
|---|---|---|---|
| 3,718,862 A * | 2/1973 | Norris .................. | H04R 1/08 455/117 |
| 5,771,441 A | 6/1998 | Altstatt | |
| 6,173,195 B1 | 1/2001 | Chen | |
| 6,778,814 B2 | 8/2004 | Koike | |
| 6,954,536 B2 | 10/2005 | Tanaka | |
| 7,324,052 B2 | 1/2008 | Hamm et al. | |

(Continued)

FOREIGN PATENT DOCUMENTS

JP     2010158007 A     7/2010

OTHER PUBLICATIONS

88W8987_SDS 2.4/5 GHZ Dual-band 1x1 Wi-Fi 5 (802.11ac) and Bluetooth 5.2 Solution; Rev. 3, Product short data sheet; Sep. 15, 2021; Retrieved from: http://www.nxp.com.

*Primary Examiner* — Hai V Tran
*Assistant Examiner* — Michael M Bouizza
(74) *Attorney, Agent, or Firm* — Banner & Witcoff, Ltd.

(57) ABSTRACT

A wireless microphone system utilizes an antenna structure that supports dual frequency bands. With some embodiments, the wireless microphone system comprises a first apparatus (for example, a wireless transmitter) and an attached second apparatus (for example, an attached microphone), where the chassis of the first apparatus and the housing of the second apparatus support the antenna structure through an electrical connector (for example, through an outer shell of a Cannon (XLR) connector) between the two apparatuses. The chassis and the housing may support first and second halves of a dipole antenna, respectively. The first apparatus supports first and second electrical circuits that are operational within a first and second frequency band, respectively, and that connect to first and second input ports of a combining circuit (for example, a diplexer filter). The output port of the combining circuit connects to the housing through the electrical connector.

35 Claims, 12 Drawing Sheets

(56) References Cited

U.S. PATENT DOCUMENTS

| | | |
|---|---|---|
| 7,414,587 B2 | 8/2008 | Stanton |
| 7,835,707 B2 | 11/2010 | Yoon |
| 7,884,775 B1 | 2/2011 | Loyet |
| 8,139,796 B2 * | 3/2012 | Nakashima .............. H01Q 1/50 |
| | | 381/189 |
| 8,576,131 B2 | 11/2013 | Szopko et al. |
| 9,484,631 B1 | 11/2016 | Napoles et al. |
| 9,876,276 B2 | 1/2018 | Bengtsson et al. |
| 10,211,518 B2 | 2/2019 | Wu et al. |
| 10,230,153 B2 | 3/2019 | Zachara et al. |
| 10,230,159 B2 | 3/2019 | Zachara et al. |
| 10,425,749 B2 | 9/2019 | Thaysen |
| 10,749,287 B2 | 8/2020 | Harwood et al. |
| 10,924,847 B2 | 2/2021 | Ryle |
| 10,938,097 B2 | 3/2021 | Hovmoller |
| 2005/0157892 A1 | 7/2005 | Chiu |
| 2007/0025567 A1 | 2/2007 | Fehr |
| 2011/0044477 A1 | 2/2011 | Huang |
| 2017/0180520 A1 | 6/2017 | Wu |
| 2022/0272432 A1 * | 8/2022 | Schillebeeckx ......... H01Q 9/26 |
| 2023/0060856 A1 * | 3/2023 | Kenkel ................ H01Q 1/2291 |

\* cited by examiner

DUAL BAND PLUG-ON TRANSMITTER ANTENNA

BACKGROUND

A wireless apparatus, such as a wireless microphone, may use some form of antenna to transmit and/or receive wireless signals. However, the antenna typically is made up of additional components that add to the manufacturing cost and complexity and that take up extra space internal or external to the apparatus. Moreover, with an external antenna, the wireless apparatus often requires additional mechanical protection to prevent damage to the antenna if the apparatus is dropped, further increasing product cost and complexity.

SUMMARY

This summary is provided to introduce a selection of concepts in a simplified form that are further described below in the Detailed Description. This Summary is not intended to identify key features or essential features of the disclosure.

According to some aspects of the present disclosure, a wireless microphone system utilizes an antenna structure that supports dual frequency bands, for example, an ultra-high frequency (UHF) band for wireless microphone connectivity and a frequency band centered around 2.4 GHz for Bluetooth, Zigbee, or Wi-Fi services. The wireless microphone system comprises a wireless transmitter and an attached microphone, where the chassis of the wireless transmitter and the housing of the attached microphone support the antenna structure through an outer shell of a Cannon (XLR) connector between the two apparatuses. For example, the chassis and connected device housing support first and second portions of an antenna, respectively.

According to further aspects of the disclosure, a plug-on transmitter uses an attached (connected) microphone as part of the antenna. An antenna is formed by physically and electrically separating the transmitter chassis from the attached microphone, where the chassis contains the RF circuit board that is grounded to the inside of the metallic chassis. An RF signal is subsequently fed to the outer shell of the XLR microphone connector, which is separated from the chassis by a plastic insulator. This approach allows the attached microphone plugged into the XLR connector and the chassis to form both halves of the antenna. The impedance and resonance of the antenna may be dependent on the geometry of the device plugged into the XLR connector.

According to further aspects of the disclosure, 2.4 GHz operation functionality is supported by a plug-on UHF transmitter for Bluetooth/Zigbee/Wifi applications. An antenna formed by the plug-on UHF transmitter and an attached device (for example, a microphone) support a dual-band dipole antenna spanning both a UHF band as well as a 2.4 GHz band. The chassis of the plug-on transmitter functions as one portion of the antenna while the attached device acts as the other portion of the antenna (for example, corresponding to two halves of a dipole antenna).

According to further aspects of the disclosure, the wireless transmitter may support first and second electrical circuits that are operational within first and second frequency bands, respectively, and may operate simultaneously with respect to each other and that connect to first and second input ports of a combining circuit (for example, a diplexer filter). The output port of the combining circuit connects to the housing through an electrical connector.

According to further aspects of the disclosure, the chassis of the wireless transmitter accommodates at least one PCB, where an electrical ground of the at least one PCB is electrically connected to the chassis. The output of a combining circuit is electrically connected to the housing of the attached microphone.

According to further aspects of the disclosure, the chassis of wireless transmitter supports a first portion of the antenna (for example, a dipole antenna) and the housing of the attached microphone supports a second portion of the antenna.

According to further aspects of the disclosure, an electrical insulator separates the electrical connector from the chassis of the wireless transmitter.

According to further aspects of the disclosure, the wireless transmitter may incorporate an electrically conductive firewall that prevents the chassis of the wireless transmitter from acting a waveguide at one of the dual-frequency bands.

According to further aspects of the disclosure, the wireless transmitter comprises a matching circuit to provide a desired degree of impedance matching of the combining circuit and the antenna structure supported by the chassis of the wireless transmitter and the housing of the attached microphone. The matching circuit may comprise at least one tunable element (for example, adjustable capacitor) that is configured according to the desired operating frequency and/or type of attached microphone.

These and other aspects will be described in Detailed Description below with reference to the various drawings.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Wireless microphone devices such as plug-on microphone transmitters often operate within an ultra-high frequency (UHF) band and utilize a second frequency band (for example, centered around 2.4 GHz) for supporting associated services. With traditional approaches, supporting the second frequency band typically requires a separate external antenna or an internal antenna placed in a non-metallic section of the chassis.

As will be explained, a wireless microphone system utilizes an antenna structure that supports dual frequency bands. With some embodiments, the wireless microphone system comprises a first apparatus (for example, a wireless transmitter and may be referred as the plug-on transmitter) and an attached second apparatus (for example, an attached microphone), where the chassis of the first apparatus and the housing of the second apparatus support the antenna structure (for example, a dipole antenna) through an electrical connector (for example, through an outer shell of a Cannon (XLR) connector) between the two apparatuses. The chassis and the housing support first and second halves of a dipole antenna, respectively. The first apparatus may support first and second electrical circuits that are operational within first and second frequency band, respectively, and that connect to first and second input ports of a combining circuit (for example, a diplexer filter). The output port of the combining circuit connects to the housing through the electrical connector.

Figure 1:
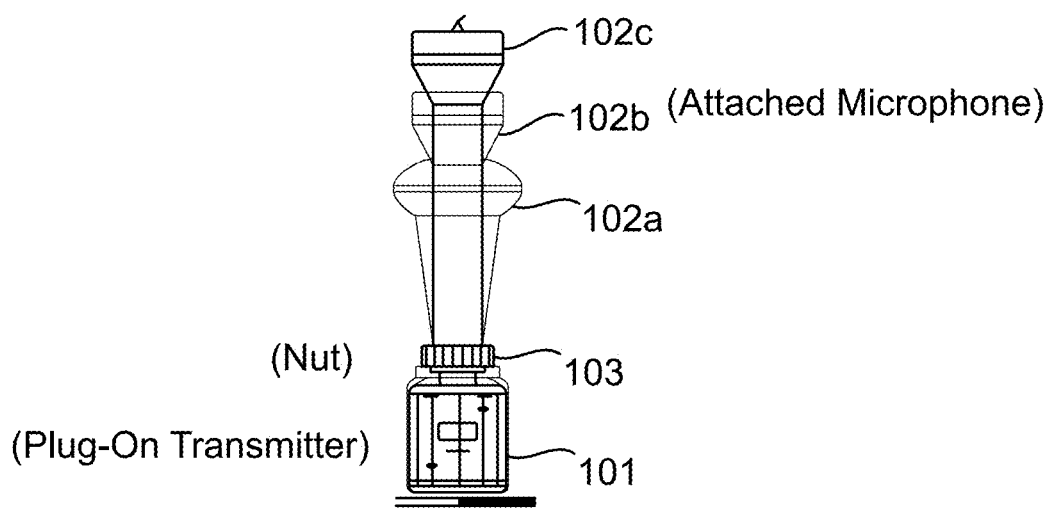
FIG. 1 shows an example of a wireless microphone system antenna assembly that may utilize in an antenna structure in accordance with one or more aspects described herein.

FIG. 1 shows an example of a wireless microphone system 100 that comprises wireless transmitter (plug-on transmitter) 101 and attached microphone 102*a*, 102*b*, or 102*c* and that may utilize in an antenna structure provided by the chassis of wireless transmitter 101 and the housing of attached microphone 102*a*, 102*b*, or 102*c*.

Wireless transmitter 101 may accommodate a selected type from a plurality of attached microphones, including different microphones manufactured by Shure, Inc. such as models SM58, VP64A, and VP64AL. Wireless transmitter 101 typically obtains an audio signal from attached microphone 102*a,b*, or c through a designated pin of an electrical connector (not explicitly shown) and transmits a first wireless signal over a UHF frequency (for example, centered at 500 MHz) conveying the audio content to base microphone equipment.

With some embodiments, a user may change the type of attached microphone 102*a,b*, or c to wireless transmitter 101. If the antenna characteristics of the attached microphones are sufficiently similar, the change may be transparent to the user. However, with some embodiments, as will be discussed, a user may identify the type of attached microphone through a mobile app so that a matching circuit can be tuned to adjust for the change.

In addition, wireless transmitter 101 may support a second wireless signal (for example, communicating with base microphone equipment or a mobile app over Wi-Fi, Zigbee, or Bluetooth RF channel centered around 2.4 GHz) that conveys configuration information about wireless microphone system 100 for UHF control of wireless transmitter 101 including RF transmitter power, audio gain, RF frequency, RF mute, audio mute, and/or other transmitter functions. The mobile app may also obtain status from wireless transmitter 101, including battery life, on/off power lock, frequency lock, audio gain lock, and/or temperature.

While nut 103 does not have a specific electrical function, it securely holds attached microphone 102 to wireless transmitter 101 through the electrical connector.

While wireless microphone system 100 may support an antenna structure for a dipole antenna, embodiments may support other types of antenna such as a monopole antenna.

While the chassis of transmitter 101 and the housing of attached microphone 102 may support first and second portions of a formed antenna, where the chassis and the housing comprise electrically conductive material such as metal, other electrically conductive elements of transmitter 101 and/or attached microphone 102 may be used. For example, transmitter 101 may utilize a housing of an attached audio mixer through an XLR connector as part of the formed antenna. With some embodiments, transmitter 101 may be connected to an attached apparatus via an extension cable (such as an XLR cable) that can be attached to transmitter 101 and terminated at the attached apparatus.

Figure 2:
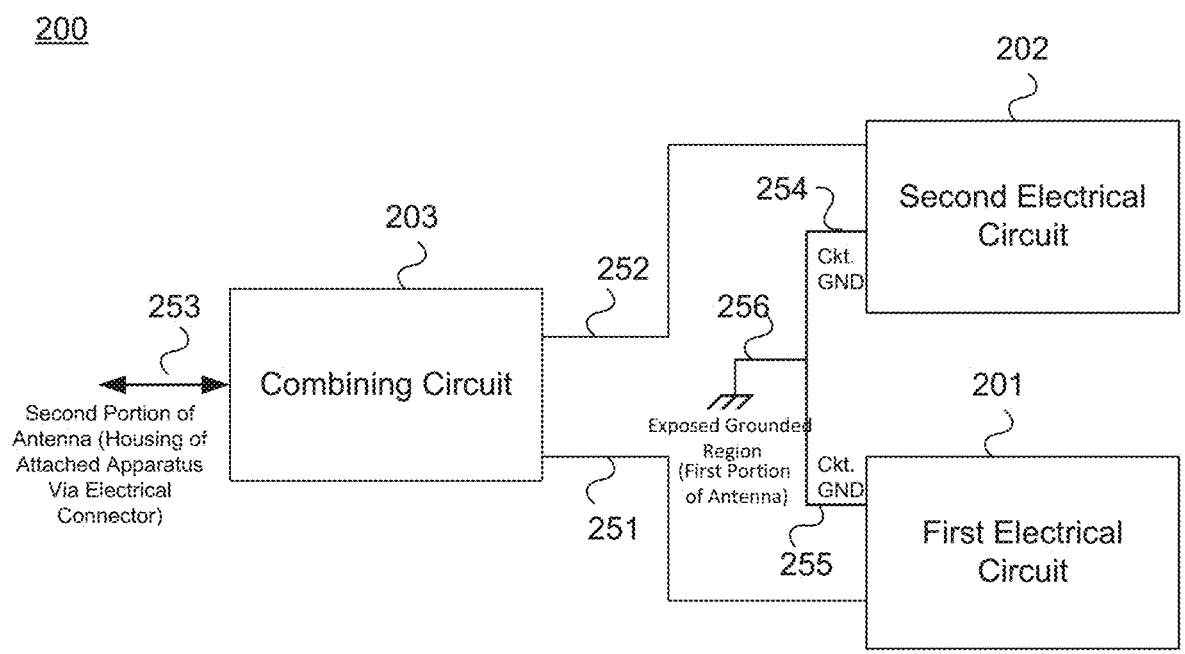
FIG. 2 shows an example of a first apparatus that may be attached to a second apparatus, where a chassis of the first apparatus and the housing of the attached second apparatus support a dual-band antenna in accordance with one or more aspects described herein.

FIG. 2 shows an example of wireless apparatus 200 that may be used with an attached apparatus (for example microphone 102), where a chassis of the wireless apparatus (for example, wireless transmitter 101) and the housing of the attached apparatus support a dual-band antenna. Embodiments may support different combinations of wireless and attached apparatuses. For example, attached apparatus may comprise different types of audio devices such as a microphone or electroacoustic transducer and wireless apparatus may comprise different types of radio devices such as a transmitter, receiver, or transceiver.

Apparatus 200 supports first electrical circuit 201 and second electrical circuit 202 which may be operational within first and second frequency bands, respectively. For example, first electrical circuit 201 may comprise a UHF transmitter operational at 500 MHz, and second electrical circuit 202 may comprise a transceiver supporting a Bluetooth connection at 2.4 GHz.

First and second electrical circuits 201 and 202 may simultaneously operate through the dual-band antenna (comprising the chassis of apparatus and the housing of attached apparatus). The dual-band antenna may support different types of communication channels such as Bluetooth, Zigbee, and/or Wi-Fi over the second frequency band (such as 2.4 GHz). For example, a Bluetooth connection may be used for short range communication and control between a plug-on transmitter and other Bluetooth enabled devices such as a cell phone or receiver.

Combining circuit 203 combines radio signals to/from first electrical circuit 201 and electrical circuit 202 via ports 251 and 252, respectively. The combined signals are available at port 253, which is electrically connected to the housing of the attached apparatus through an electrical connector. First and second portions of the dual-band antenna correspond to the chassis of wireless apparatus 200 and the housing of the attached apparatus, respectively.

Electrical connectivity through the electrical connector may be obtained by utilizing different components of the electrical connector. For example, connectivity through the electrical connector may be obtained through a shell or through a designated pin of the electrical connector.

Combining circuit 203 may assume different forms including, but limited, to a diplexer filter and a power splitter/combiner.

With some embodiments, circuit grounds (electrical grounds) 254, 255 of electrical circuits 201,202 are connected to electromagnetically exposed grounded region 256 (for example, metallic chassis 256) of apparatus 200 and outputs 251,252 of electrical circuits 201,202 are connected to the housing of the attached apparatus through port 253 of combining circuit 203. However, some embodiments may support reversing the connections to the supported antenna. Consequently, outputs 251,252 may be connected to metallic chassis 256 and circuit grounds 254,255 may connected to the housing of the attached apparatus.

In order for the chassis of wireless apparatus to be electromagnetically exposed (corresponding to exposed grounded region 256 and thus able to form a portion of the formed antenna), the chassis comprises an electrically conductive material such as metal. In such a situation, inside elements of wireless apparatus 200 are electromagnetically shielded and are thus prevented from effectively serving as a part of the formed antenna. However, with embodiments where the chassis comprises electrically non-conductive material (for example, a plastic), inside elements of wireless apparatus 200 are not electromagnetically shielded, electromagnetically exposed grounded region 256 may comprise one or more inside elements of apparatus 200. With some embodiments, the chassis of wireless apparatus 200 may comprise a plastic material so that a region of a printed circuit board (PCB) within the chassis may serve as a portion of the formed antenna. For example, electromagnetically exposed grounded region 256 may comprise one or more PCB ground planes that are electrically connected to circuit grounds 254,255.

Embodiments may support different combinations of dual-bands, including, but not limited to, UHF/2.4 GHz, 2.4 GHz/5.8 GHz, and 1.8 GHz/2.4 GHz. Embodiments may accommodate different combinations by adjusting physical dimensions of the wireless apparatus and/or attached apparatus, including a matching circuit with appropriate electrical characteristics, and/or adjusting/updating the overall RF circuitry on the PCB for different combinations of dual-bands.

Embodiments may also support more than two frequency bands, where combining circuit 203 may comprise more than two input ports that are connected to different electrical circuits. As an example, exposed grounded region 256 and an attached apparatus may support a formed multi-band antenna for three frequency bands such as UHF, 2.4 GHz, and 1.8 GHz or UHF, 2.4 GHz, and 5.8 GHz.

Figure 3:
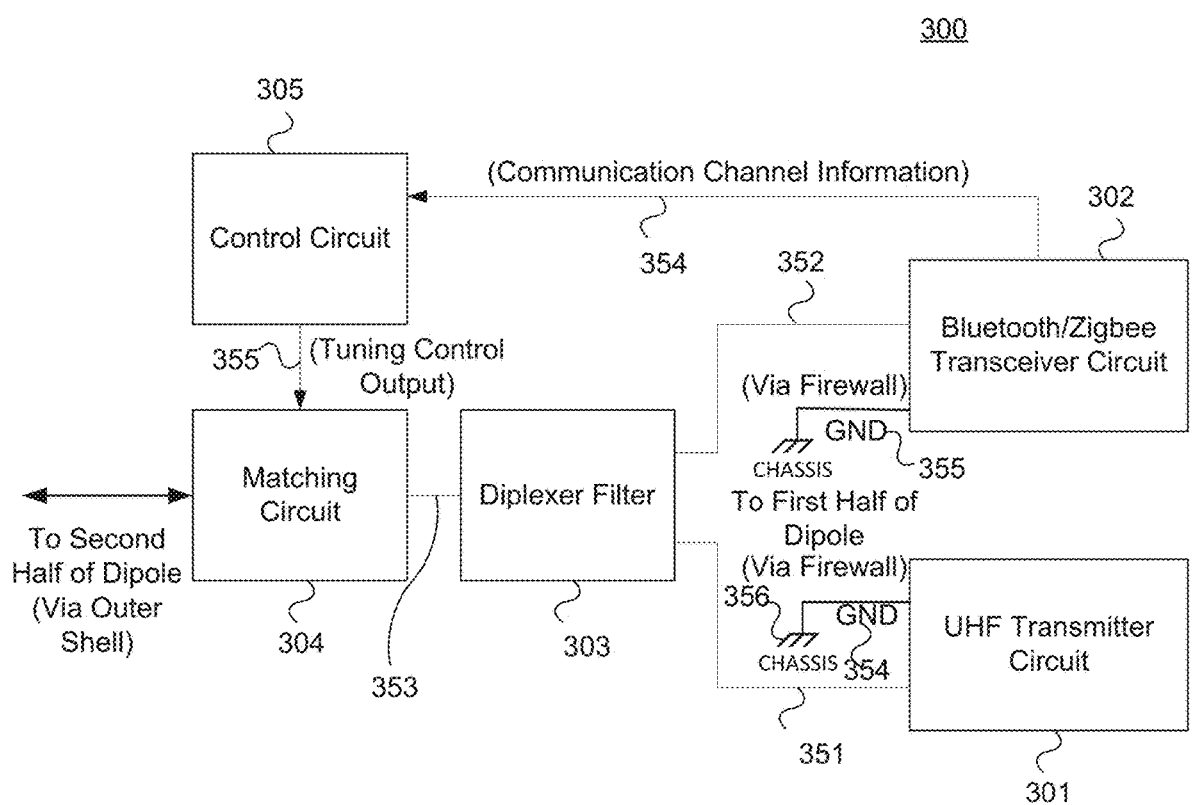
FIG. 3 shows an example of an apparatus supporting a wireless transmitter of the microphone system that is shown in FIG. 1 in accordance with one or more aspects described herein.

FIG. 3 shows an example of apparatus 300 that may support wireless transmitter 101 as shown in FIG. 1.

A dual-band dipole antenna is formed by chassis 356 being electrically connected to ground 354,355 of circuits 301 and 302 and the housing (not explicitly shown) of the attached apparatus being electrically connected to outputs 351 and 352 through diplexer 303, matching circuit 304, and the outer shell of the electrical connector between apparatus 300 and the attached apparatus.

As will be discussed, chassis 356 may be connected to ground 354,355 via an electrically conductive firewall (for example, metallic) to prevent chassis 356 from acting as a waveguide based on the dimensions of chassis 356 with respect to the frequency of operation.

Apparatus 300 comprises UHF transmitter circuit 301 and Bluetooth transceiver circuit 302 that may support dual-band operation within a UHF spectrum (for example, 500 MHz) and an RF spectrum centered around 2.4 GHz, respectively. However, embodiments may support other types of communication channels and/or frequency bands. For example, circuit 302 may support a Zigbee connection that may have a comparable operational distance with respect to the UHF link range and may be used for controlling functions/parameters of UHF transmitter circuit 301.

With some embodiments, apparatus 300 may be attached to any device with a male XLR connector (for example, a microphone) to provide a dual-band dipole antenna simultaneously for UHF and 2.4 GHz application.

Apparatus 300 uses UHF/2.4 Ghz diplexer filter 303 to route signals from output 351 of UHF transmitter circuit 301 and Bluetooth/Zigbee transceiver circuits 302. Common output port 353 of diplexer 303 is electrically connected to the outer shell of a Cannon (XLR) connector through matching circuit 304.

Any attached device that electrically connects to the XLR's outer shell may be used as part of the dipole antenna for the UHF and 2.4 GHz circuits 301 and 302. Diplexer 303 may employ additional elements for matching, tuning or optimizing antenna performance in one or both bands. The matching electrical elements may be fixed values or electronically tunable. However, with some embodiments matching circuit 304 may not be required if the inherent impedance of the of the dual-band dipole antenna is sufficiently matched to the impedance at port 353.

Matching circuit 304 may comprise fixed element and/or adjustable elements (for example, an electrically adjustable capacitor) in order to obtain desirable operating characteristics such as a desired maximum voltage standing wave ratio (VSWR) at the operating frequency. Typically, it is preferable for the VSWR to be as close to 1 for the operating frequency range as possible.

With some embodiments matching circuit 304 may be adjustable so that it may be tuned for different characteristics such as different operating frequencies. Also, as previously discussed, embodiments may support different types of attached microphones. Because the impedance and resonance of the dual-band antenna may be dependent on the geometry of the attached microphone, the user may identify the microphone type (for example, Shure SM58, VP64A, or VP64AL) through a smart phone app via a Bluetooth connection and Bluetooth transceiver circuit 302, which may obtain channel information 354 from the corresponding received signal. Control circuit 305 may subsequently extract configuration information and transform it into tuning control output 355 (for example, a digital/continuous signal) and present it to matching circuit 304. Circuit 304 then adjusts at least one electrical element to obtain desired matching characteristics.

Figure 4:
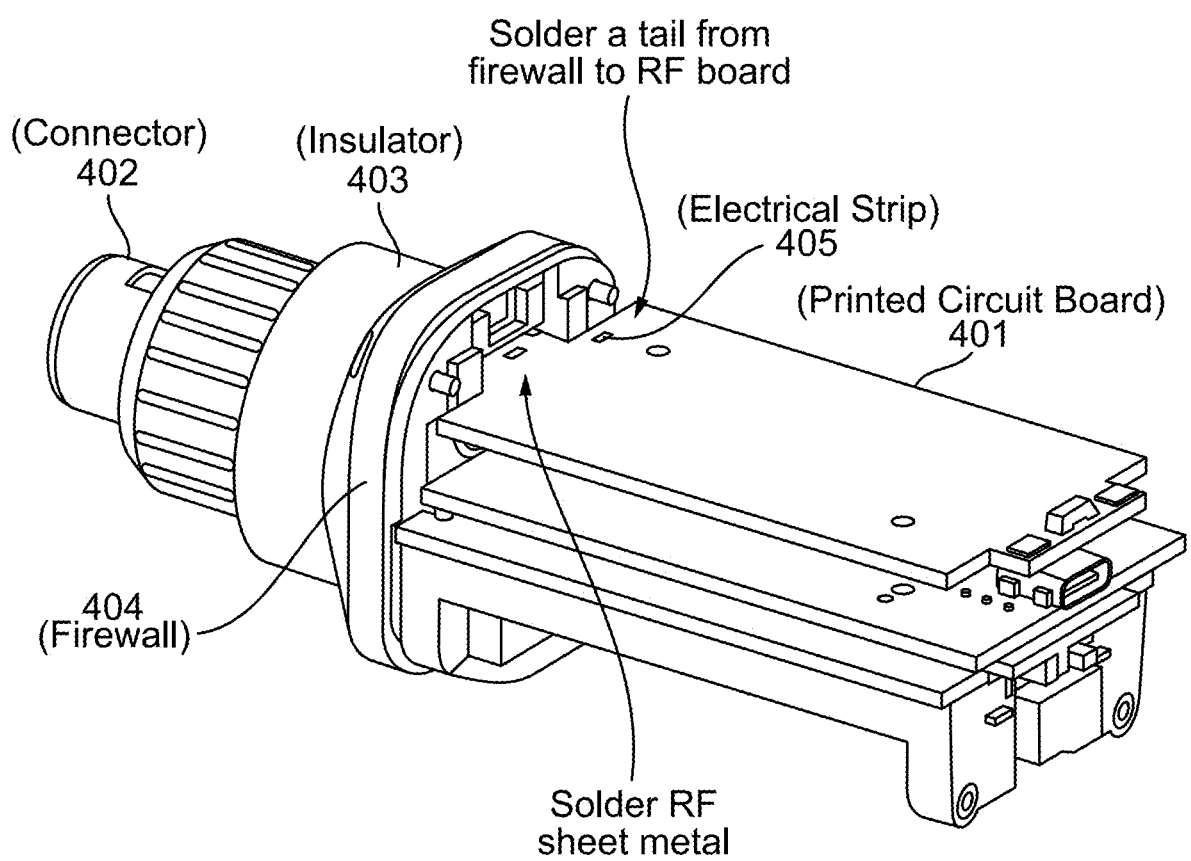
FIG. 4 shows an example of a physical layout for a wireless transmitter that is shown in FIG. 1 in accordance with one or more aspects described herein.

FIG. 4 shows an example of a physical layout for wireless transmitter 101 as shown in FIG. 1 with the chassis (which may act as a cover) removed.

Plug-on transmitter 101, in conjunction with connected microphone 102, forms a dipole antenna. A dipole antenna is formed by physically separating the transmitter chassis from the attached microphone. The chassis contains RF circuit board 401, which is grounded to the inside of the metallic chassis. An RF signal is subsequently fed to the shell of the XLR microphone connector 402.

Electrical circuits 201, 202, 301, or 302 may be accommodated by one or more printed circuit boards (PCB's), for example printed circuit board 401. The ground of the electrical circuits is electrically connected to the chassis (shown as chassis 501 in FIG. 5) through firewall 404 (which is electrically conductive and may be metallic and which is electrically connected to the chassis) by electrically binding firewall 404 to printed circuit board 401 via electrically conductive strip 405.

The XLR connector 402 is separated from the chassis by plastic insulator 403. This allows an attached device (for example, microphone 102) plugged into XLR connector 402 and the chassis to form both halves of a dipole antenna. The impedance and resonance of the antenna are typically dependent on the geometry of the attached device. Since the antenna may also used for Bluetooth/Zigbee frequencies, the antenna performance may address operation in the 2.4 GHz band as well as the UHF band (for example, around 500 MHz).

Chassis 501 may form a waveguide and a resonance cavity due to its closed metallic walls. This waveguide may allow the signal propagation coupled from the opening of the enclosure on the XLR connector side at the operating frequencies. This may reduce the antenna efficiency. To minimize the effects of cavity formation, metal firewall 404 is placed at the top (near the connector) of chassis 501. Firewall 404 may address several purposes. First, firewall 404 may prevent the chassis from forming an efficient waveguide at 2.4 GHz operating frequency range and at other undesired higher frequencies. Second, firewall 404 provides a ground connection between PCB 401 and chassis 501 at or near antenna feed (XLR) connector 402. Third, it may prevent undesired RF signals (for example, at 2.4 GHz or higher) from coupling inside the cavity and affecting the audio circuitry nested in the cavity to generate undesired audio artifacts. Having firewall 404 in place typically reduces undesired signal coupling between plug-on transmitter 101 and the attached apparatus such as attached microphone 102a.

Figure 5:
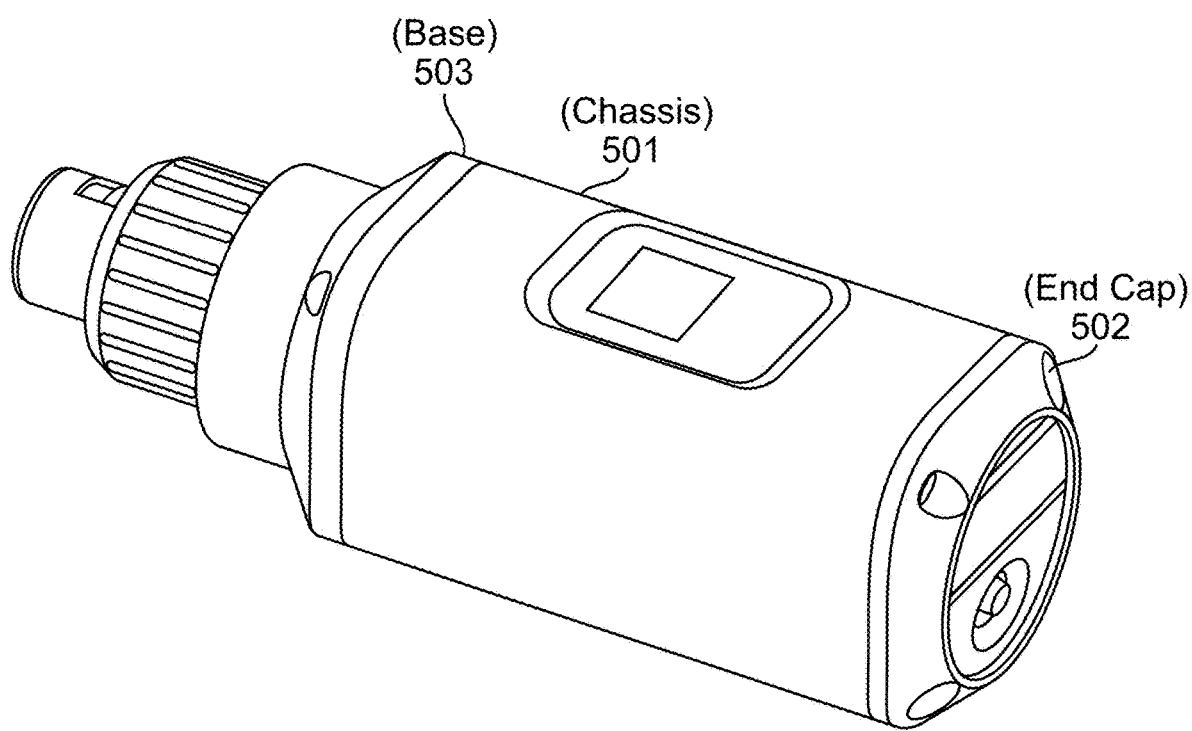
FIG. 5 shows an example of the physical layout of the wireless transmitter shown in FIG. 4 with a chassis installed in accordance with one or more aspects described herein.

FIG. 5 shows an example of the physical layout as shown in FIG. 4 with chassis 501 installed, where chassis 501 encloses wireless transmitter 101.

With some embodiments, chassis 501 mates with base 503 so that the electrical ground of PCB 401 is electrically connected to chassis 501 through firewall 404 as shown in FIG. 4. However, with some embodiments, chassis 501 may connect to the ground of PCB 401 in another manner, for example via a conductive wire or metallic strip.

End cap 502 is installed at the end of chassis 501. End cap 501 may be constructed from a non-metallic material, in which case the dual-band antenna characteristics are not affected by end cap 501.

Figure 6:
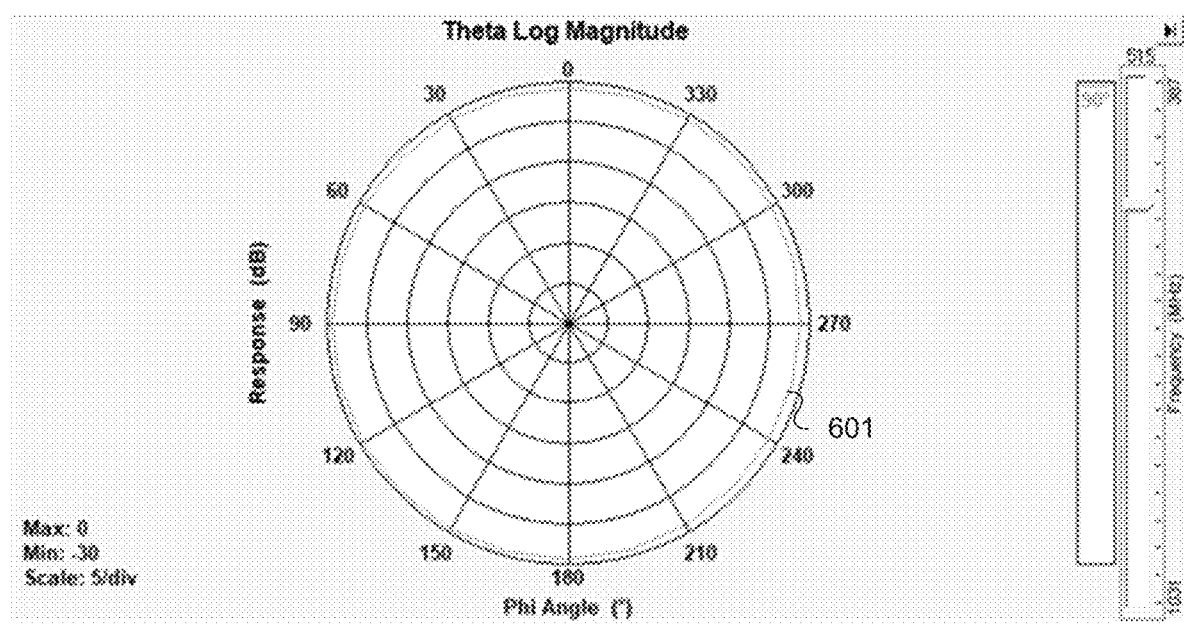
FIG. 6 shows an example of an antenna gain plot at 515 MHz for the microphone system shown in FIG. 1 in accordance with one or more aspects described herein.
Figure 7:
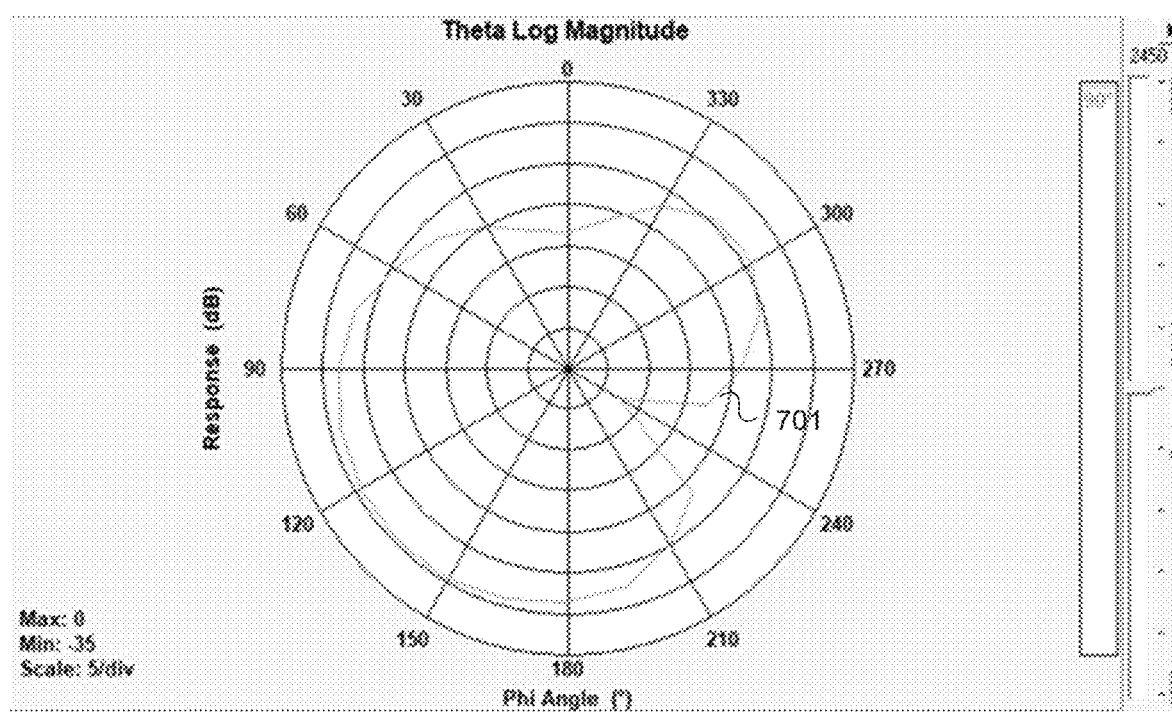
FIG. 7 shows an example of an antenna gain plot at 2.45 GHz for the microphone system shown in FIG. 1 in accordance with one or more aspects described herein.
Figure 8:
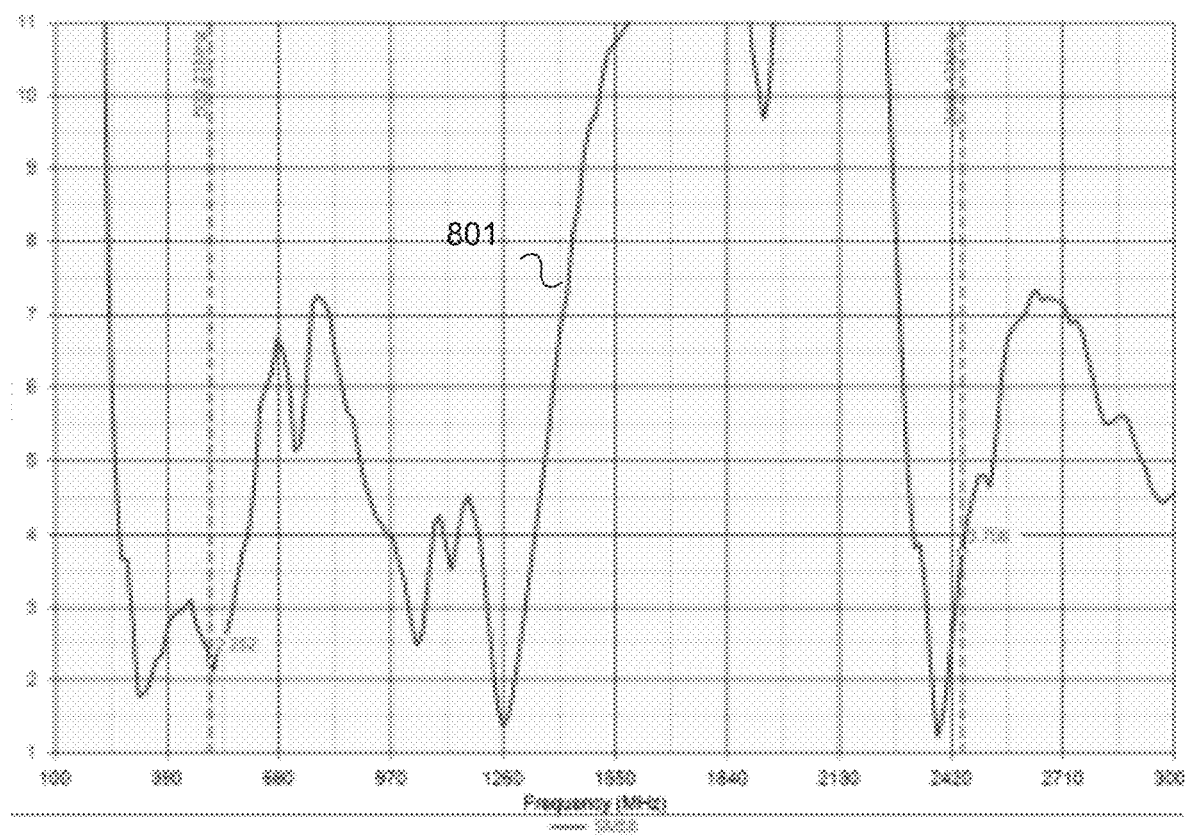
FIG. 8 shows an example of a VSWR plot for the dual-band dipole antenna for the microphone system shown in FIG. 1 in accordance with one or more aspects described herein.

Because a dual-band antenna may be also used for Bluetooth/Zigbee frequencies, antenna performance is evaluated in the 2.4 GHz band as well as the UHF band. FIGS. 6-8 show results of simulations of an exemplary embodiment at 500 MHz and 2.4 GHz. Microphone system 100 (where attached microphone 102 comprises Shure model SM58) is oriented along the z-axis. The simulations are based on the inherent antenna characteristics of the attached combination without the inclusion of matching circuit 304 as shown 3.

FIG. 6 shows an example of an antenna gain plot 601 at 515 MHz of a dual-band antenna as a function of $\varphi$ (phi) for the microphone system 100 at a theta of 90 degrees. The antenna gain is approximately 0 dBi with an omnidirectional pattern and the polarization is primarily in the $\theta$ (theta) direction.

FIG. 7 shows an example of an antenna gain plot 701 at 2.45 GHz of the dual-band antenna as a function of $\varphi$ for microphone system 100 at a theta of 90 degrees. The antenna total gain is −0.29 dBi (at Theta equals 30 degrees not explicitly shown) with multiple lobes. The polarization is primarily in the $\theta$ direction, but the gain in the $\varphi$ direction is significant with a gain of −2.5 dBi not explicitly shown.

FIG. 8 shows an example of a VSWR plot 801 for dual-band dipole antenna formed by microphone system 100. As shown FIG. 8, the VSWR at 0.5 GHz is approximately 2.25:1, and the VSWR at 2.4 GHz is approximately 3.75:1. Approximately one third of the applied power is propagated into space while two thirds is lost to mismatch reflection and PCB losses.

While FIGS. 6-8 illustrate antenna performance at approximately 500 MHz and 2.45 GHz, embodiments may support other frequency bands. The geometry of wireless apparatus 200 (as shown in FIG. 2) and the attached apparatus may be adjusted accordingly as well as incorporating matching circuit 304 (as shown in FIG. 3) to provide a preferred antenna performance with respect to the inherent antenna characteristics of the antenna formed by apparatus 200 and the attached apparatus.

Figure 9:
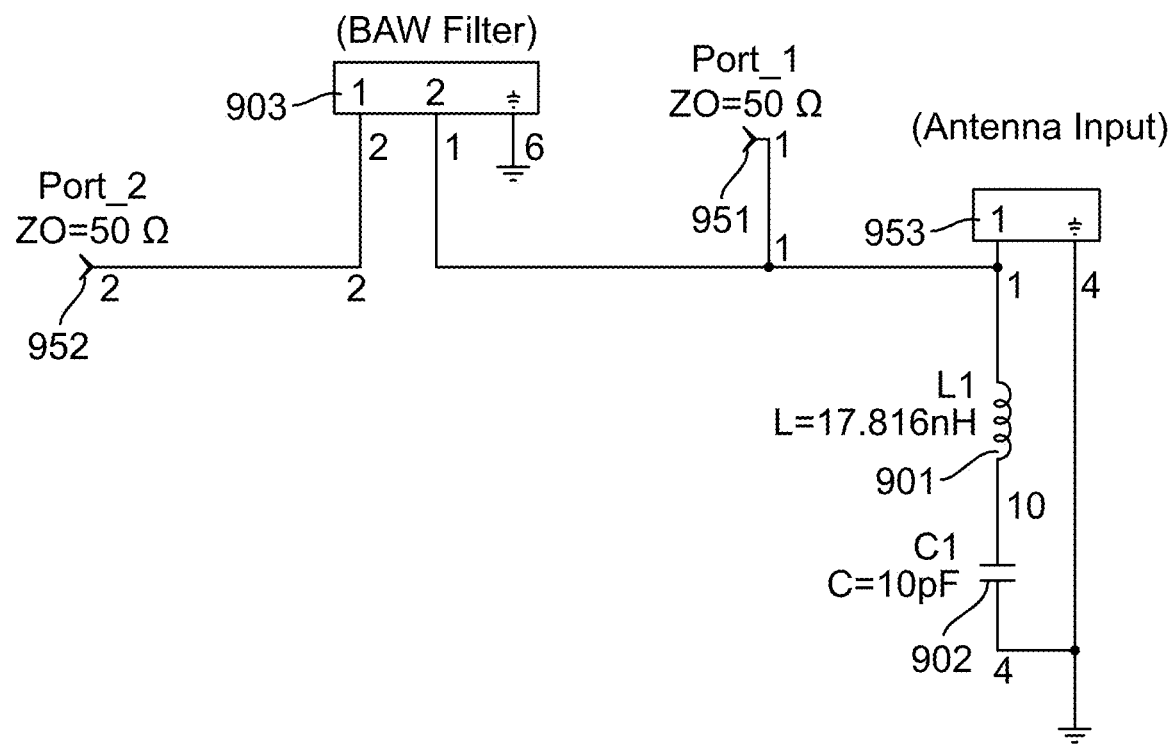
FIG. 9 shows an example of electrical circuitry for the matching circuit shown in FIG. 3 in accordance with one or more aspects described herein.

FIG. 9 shows an example of electrical circuitry for matching circuit 304 shown in FIG. 3. Port 951 corresponds to the UHF feed into antenna input 953 of the antenna formed by wireless microphone system 100. Port 952 corresponds to the 2.4 GHz feed into bulk acoustic wave (BAW) filter 903. (BAW filter 903 may be an interdigital transducer that converts electrical energy to mechanical acoustic waves that travel through the surface of the piezoelectric material and are stored in it.)

The output of BAW filter 903 and port 951 both feed antenna input 953. Matching elements L1 901 (nominally 17.8 nH) and C1 902 (nominally 10 pF) match the antenna to both ports 951 and 952. The value of C1 902 may be digitally tunable and may be adjusted to match port 951 to the desired UHF frequency. The match to port 952 is not significantly changed by changes to C1 902 because L1 901 acts as high impedance at 2.4 GHz.

Figure 10:
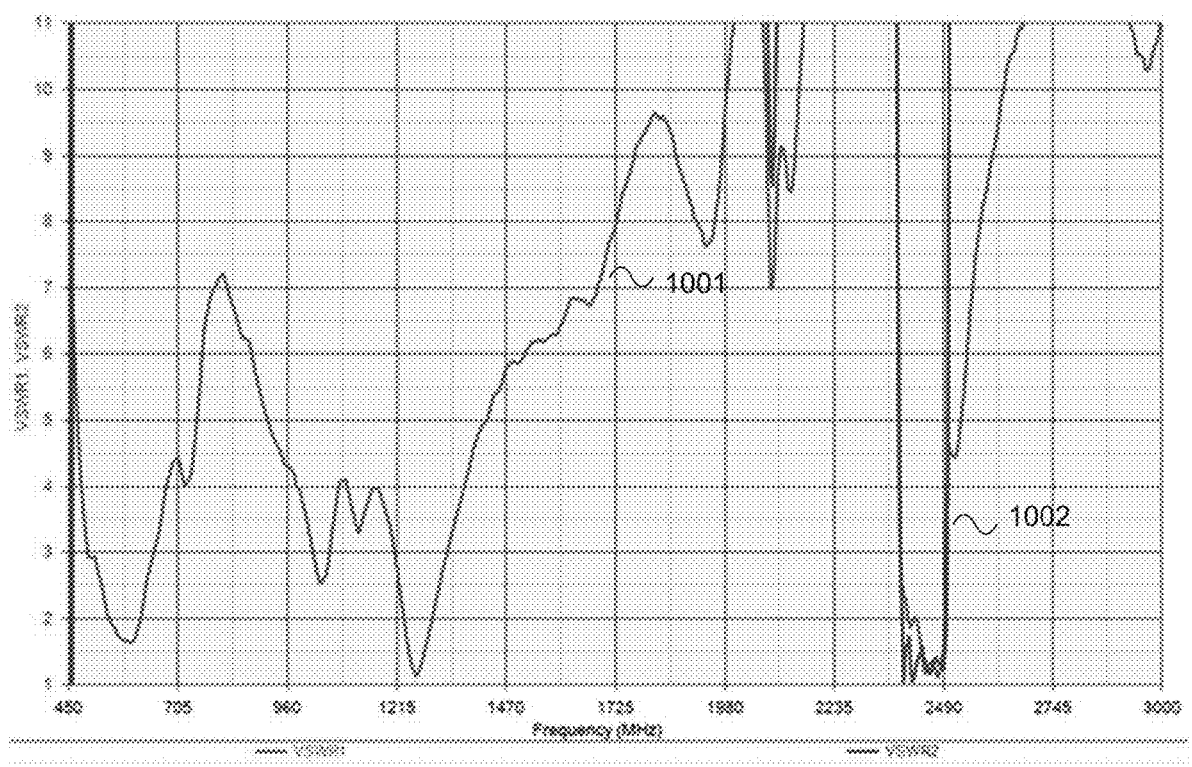
FIG. 10 shows an example of VSWR plots matched at 560 MHz using the matching circuit shown in FIG. 9 in accordance with one or more aspects described herein.
Figure 11:
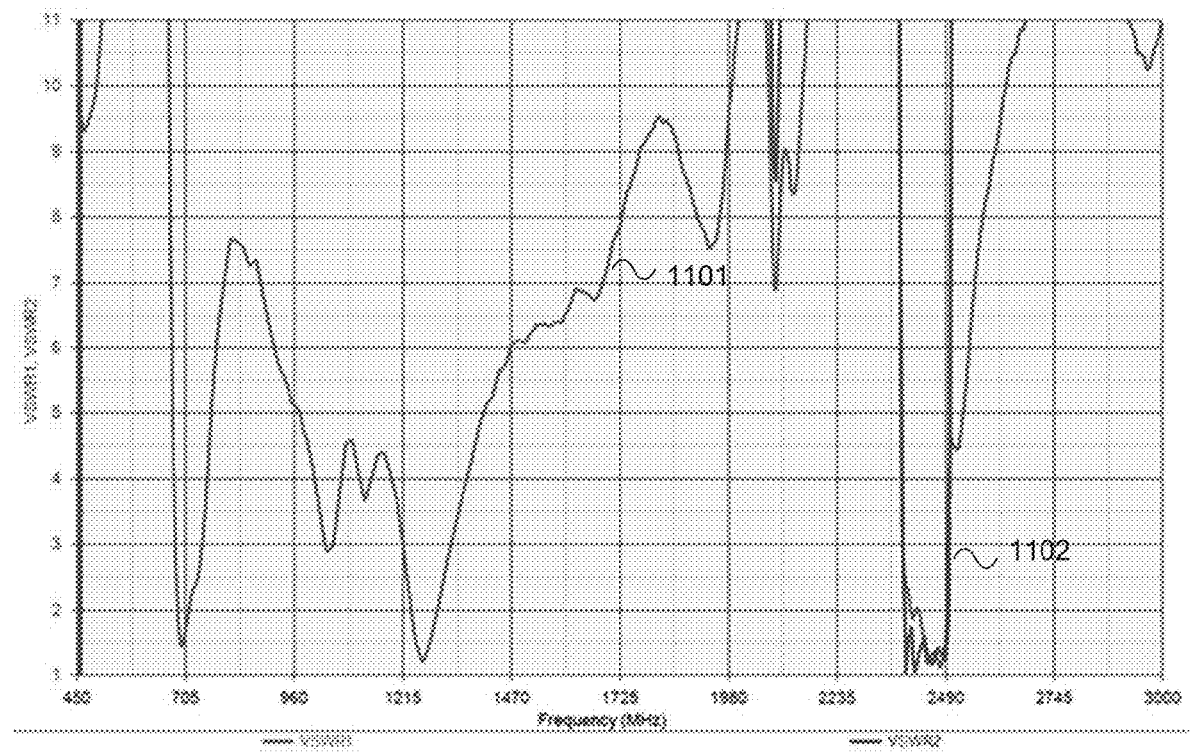
FIG. 11 shows an example of VSWR plots matched at 700 MHz using the matching circuit shown in FIG. 9 in accordance with one or more aspects described herein.

FIGS. 10 and 11 show results of simulations for microphone system 100 (where the attached microphone corresponds to Shure model SM58) with the matching circuit shown in FIG. 9.

FIG. 10 shows an example of VSWR plots matched at 560 MHz using the matching circuit shown in FIG. 9. VSWR plot 1001 corresponds to port 951 (UHF feed) and VSWR plot 1002 corresponds to port 952 (2.4 GHz feed). The VSWR at 560 MHz is approximately 1.6:1 while the VSWR at 700 MHz is approximately 4.2:1.

FIG. 11 shows an example of VSWR plots matched at 700 MHz using the matching circuit shown in FIG. 9. VSWR plot 1101 corresponds to port 951 (UHF feed) and VSWR plot 1102 corresponds to port 952 (2.4 GHz feed).

Because the matching circuit in FIG. 9 is tuned to 700 MHz, the VSWR at 700 MHz is changed to approximately 1.5:1. In order to tune the matching circuit in FIG. 9 to 700 MHz, C1 902 is changed from 10 pf to 3.7 pF.

Because the match to port 952 is not significantly changed by changes to C1 902 because L1 901 acts as high impedance at 2.4 GHz, VSWR plots 1002 and 1102 may appear to be essentially the same.

Figure 12:
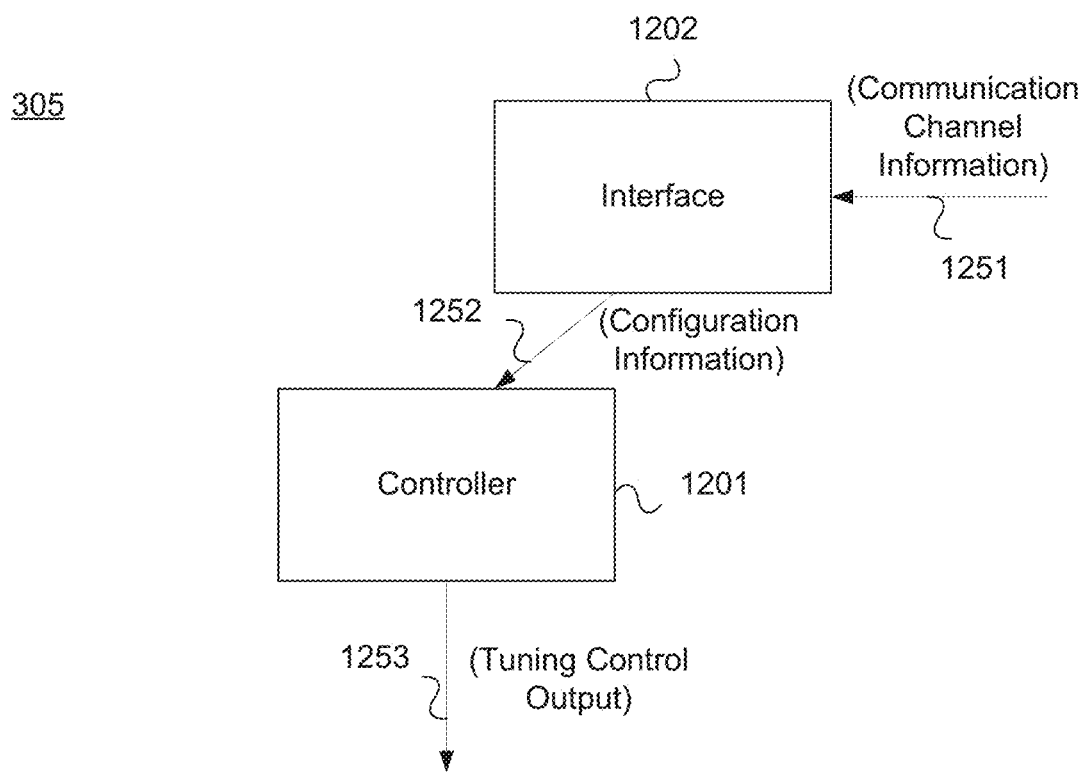
FIG. 12 shows an example of the control circuit shown in FIG. 3 in accordance with one or more aspects described herein.

FIG. 12 shows an example of control circuit 305 shown in FIG. 3 and may be used to control the matching circuit shown in FIG. 9. Communication channel information 1251 (for example, obtained via a Bluetooth connection) is presented to interface 1202, which extracts configuration information 1252 about the attached microphone (for example, the microphone model) and/or about the operating frequencies (for example, the UHF operating frequency). Configuration information 1252 is then presented to controller 1201 to generate corresponding tuning control output 1253 (which may be digital or analog) that is presented to the matching circuit. For example, as discussed with FIG. 9, when the desired operating UHF is at 700 MHz, tuning control output 1253 changes C1 902 from 10 pF to 3.7 pF.

Controller 1201 may comprise a processing device and/or a memory device that stores computer-readable instructions for the processing device to execute.

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Exemplary Clauses

1. A wireless apparatus comprising:
    a first electrical circuit processing a first RF signal within a first frequency band;
    a second electrical circuit processing a second RF signal within a second frequency band;
    a chassis accommodating the first and second electrical circuits, wherein an electrical ground of the first and second electrical circuits are electrically connected to the chassis; and
    an electrical connector electrically connecting the wireless apparatus to an attached electrical apparatus,
    wherein a combined RF signal comprises the first RF signal within the first frequency band and the second RF signal within the second frequency band,
    wherein the combined RF signal is electrically coupled to a housing of the attached electrical apparatus through the electrical connector,
    wherein the chassis of the wireless apparatus and the housing of the attached electrical apparatus support an antenna that is operational at both the first and second frequency bands, and
    wherein the chassis supports a first portion of the antenna and the housing supports a second portion of the antenna.

2. The wireless apparatus of clause 1 further comprising:
    an electrical insulator separating the electrical connector from the chassis.

3. The wireless apparatus of clause 1 further comprising:
    a combining circuit having first and second ports operational only at the first and second frequency bands, respectively, and a third port operational at the combined first and second frequency bands,
    wherein the first and second electrical circuits electrically connect to the first and second ports of the combining circuit, respectively,
    wherein the third port of the combining circuit electrically connects to a first component of the electrical connector, and
    wherein the first component of the electrical connector electrically connects to the housing of the attached electrical apparatus.

4. The wireless apparatus of clause 1, further comprising:
    at least one printed circuit board (PCB) accommodating the first and second electrical circuits.

5. The wireless apparatus of clause 4, comprising:
    a firewall located at a top of the chassis and providing a ground connection between the at least one PCB and the chassis within a predetermined distance of the electrical connector.

6. The wireless apparatus of clause 5, wherein the firewall prevents the chassis from forming a waveguide at one of the first and second frequency bands.

7. The wireless apparatus of clause 1, wherein the first electrical circuit comprises a transmitter operational within the first frequency band.

8. The wireless apparatus of clause 1, wherein the second electrical circuit comprises a transceiver operational within the second frequency band.

9. The wireless apparatus of clause 3, wherein the first component of the electrical connector comprises an outer shell.

10. The wireless apparatus of clause 3, wherein the combining circuit comprises a diplexer filter.

11. The wireless apparatus of clause 3, further comprising a matching circuit, wherein the third port of the combining circuit connects to the first component of the electrical connector through the matching circuit and provides a predetermined degree of impedance matching between the combining circuit and the antenna.

12. The wireless apparatus of clause 11, wherein the matching circuit comprises at least one electrically tunable element.

13. The wireless apparatus of clause 12 further comprising:
    a control circuit configured to configure the at least one electrically tunable element is based on an identity of the attached electrical apparatus, wherein the attached electrical apparatus is one of a plurality of different types of attached electrical apparatuses.

14. The wireless apparatus of clause 13, wherein the identity of the attached electrical apparatus is obtained from identity data conveyed via a communications channel through one of the first and second electrical circuits.

15. The wireless apparatus of clause 1, wherein the antenna comprises a dipole antenna.

16. The wireless apparatus of clause 1, wherein the attached electrical apparatus comprises a microphone and wherein the attached electrical apparatus provides an audio signal to the wireless apparatus through a second component of the electrical connector.

17. The wireless apparatus of clause 1, wherein the first and second electrical circuits are configured to operate simultaneously with respect to each electrical circuit.

18. A dipole antenna supporting a wireless microphone system, wherein the wireless microphone system comprises a first apparatus and a second apparatus, the dipole antenna comprises:
   a chassis of the first apparatus, wherein the chassis is connected to an electrical ground of an electrical circuitry of the first apparatus; and
   a housing of the second apparatus,
   wherein the first and second apparatuses interact through an electrical connector,
   wherein the housing of the second apparatus is electrically connected to the electrical circuitry of the first apparatus through an outer shell of an electrical connector,
   wherein the chassis and housing support first and second portions of the dipole antenna, respectively, and
   wherein the dipole antenna supports both a first frequency band and a second frequency band.

19. The dipole antenna of clause 18, wherein the first frequency band is within an ultra-high frequency (UHF) spectrum and the second frequency band is centered around approximately 2.4 GHz.

20. The dipole antenna of clause 18, wherein the first frequency band is centered around approximately 5.8 GHz and the second frequency band is centered around approximately 2.4 GHz.

21. The dipole antenna of clause 18, wherein the first frequency band is centered around approximately 1.8 GHz and the second frequency band is centered around approximately 2.4 GHz.

22. The dipole antenna of clause 18, wherein the chassis comprises an outside covering of the first apparatus.

23. A multi-band antenna supporting a wireless microphone system, wherein the wireless microphone system comprises a first apparatus and a second apparatus, the multi-band antenna comprising:
   a first electrically conductive element of the first apparatus; and
   a second electrically conductive element of the second apparatus,
   wherein the first electrically conductive element and second electrically conductive element form first and second portions of the multi-band antenna, respectively, and
   wherein the multi-band antenna supports at least two discontinuous frequency bands.

24. The multi-band antenna of clause 23, wherein the first electrically conductive element comprises a chassis of the first apparatus and the second electrically conductive element comprises a housing of the second apparatus.

25. The multi-band antenna of clause 24, wherein one of the chassis and the housing is connected to an electrical ground of the first apparatus.

26. The multi-band antenna of clause 25, wherein the housing of the second apparatus is electrically connected to an output of the first apparatus through a first component of an electrical connector and the chassis is connected to the electrical ground.

27. The multi-band antenna of clause 25, wherein the housing of the second apparatus is electrically connected to the electrical ground through a second component of an electrical connector.

28. The multi-band antenna of clause 23, wherein the first apparatus comprises a plug-on transmitter and the second apparatus comprises an attached microphone.

29. The multi-band antenna of clause 23, wherein the second apparatus provides an audio signal to the first apparatus through a third component of an electrical connector.

30. The multi-band antenna of clause 23, wherein the multi-band antenna comprises a dual-band dipole antenna.

31. The multi-band antenna of clause 23, wherein the first electrically conductive element comprises a region of a printed circuit board (PCB) of the first apparatus and the second electrically conductive element comprises a housing of the second apparatus and wherein a chassis of the first apparatus comprises an electrically non-conductive material.

32. The multi-band antenna of clause 31, wherein one of the region of the PCB of the first apparatus and the housing of the second apparatus is connected to an electrical ground of the first apparatus.

33. The multi-band antenna of claim 31, wherein the chassis serves as an electrical insulator between the second apparatus and the PCB.

34. A method for transmitting a combined RF signal by a wireless transmitter connected to an attached microphone, wherein the combined RF signal comprises a first RF signal within a first frequency band and a second RF signal within a second frequency band, the method comprising;
   generating, by a first electrical circuit of the wireless transmitter, the first RF signal within the first frequency band;
   generating, by a second electrical circuit of the wireless transmitter, the second RF signal within the second frequency band;
   connecting an electrical ground of the first and second electrical circuits to a chassis of the wireless transmitter;
   combining the first and second RF signals to form the combined RF signal; and
   coupling the combined RF signal to a housing of the attached apparatus,
   wherein the chassis of the wireless transmitter and the housing of the attached microphone form a first portion and a second portion of dual-band antenna, respectively.

35. The method of clause 34, further comprising:
   connecting the RF transmitter with the housing of the attached microphone via an electrical connector;
   electrically insulating the chassis of the RF transmitter from the electrical connector; and
   coupling the combined RF signal to the housing through the electrical connector.

What is claimed is:
1. A wireless apparatus comprising:
   a first electrical circuit configured to process a first RF signal within a first frequency band;
   a second electrical circuit configured to process a second RF signal within a second frequency band;

a chassis accommodating the first and second electrical circuits, wherein an electrical ground of the first and second electrical circuits are electrically connected to the chassis; and an electrical connector electrically connecting the wireless apparatus to an attached electrical apparatus, wherein a combined RF signal comprises the first RF signal within the first frequency band and the second RF signal within the second frequency band, wherein a housing of the attached electrical apparatus is configured to electrically couple the combined RF signal through the electrical connector, wherein the chassis of the wireless apparatus and the housing of the attached electrical apparatus support an antenna that is operational at both the first and second frequency bands, and wherein the chassis supports a first portion of the antenna and the housing supports a second portion of the antenna.

2. The wireless apparatus of claim 1 further comprising:
an electrical insulator separating the electrical connector from the chassis.

3. The wireless apparatus of claim 1, further comprising:
a combining circuit having first and second ports operational only at the first and second frequency bands, respectively, and a third port operational at both the first and second frequency bands, wherein the first and second electrical circuits electrically connect to the first and second ports of the combining circuit, respectively, wherein the third port of the combining circuit electrically connects to a first component of the electrical connector, and wherein the first component of the electrical connector electrically connects to the housing of the attached electrical apparatus.

4. The wireless apparatus of claim 3, wherein the first component of the electrical connector comprises an outer shell.

5. The wireless apparatus of claim 3, wherein the combining circuit comprises a diplexer filter.

6. The wireless apparatus of claim 3, further comprising a matching circuit, wherein the third port of the combining circuit connects to the first component of the electrical connector through the matching circuit and provides a predetermined degree of impedance matching between the combining circuit and the antenna.

7. The wireless apparatus of claim 6, wherein the matching circuit comprises at least one electrically tunable element.

8. The wireless apparatus of claim 7 further comprising:
a control circuit configured to configure the at least one electrically tunable element is based on an identity of the attached electrical apparatus, wherein the attached electrical apparatus is one of a plurality of different types of attached electrical apparatuses.

9. The wireless apparatus of claim 8, wherein the identity of the attached electrical apparatus is obtained from identity data conveyed via a communications channel through one of the first and second electrical circuits.

10. The wireless apparatus of claim 1, further comprising:
at least one printed circuit board (PCB) accommodating the first and second electrical circuits.

11. The wireless apparatus of claim 10, comprising:
a firewall located at a top of the chassis and providing a ground connection between the at least one PCB and the chassis within a predetermined distance of the electrical connector.

12. The wireless apparatus of claim 11, wherein the firewall is configured to prevent the chassis from forming a waveguide at one of the first and second frequency bands.

13. The wireless apparatus of claim 1, wherein the first electrical circuit comprises a transmitter operational within the first frequency band.

14. The wireless apparatus of claim 1, wherein the second electrical circuit comprises a transceiver operational within the second frequency band.

15. The wireless apparatus of claim 1, wherein the antenna comprises a dipole antenna.

16. The wireless apparatus of claim 1, wherein the attached electrical apparatus comprises a microphone, and wherein the attached electrical apparatus is configured to provide an audio signal to the wireless apparatus through a second component of the electrical connector.

17. The wireless apparatus of claim 1, wherein the first and second electrical circuits are configured to operate simultaneously.

18. A wireless microphone system comprising:
a wireless transmitter comprising:
a first electrical circuit configured to process a first radio frequency (RF) signal within a first frequency band;
a second electrical circuit configured to process a second RF signal within a second frequency band; and
a chassis accommodating the first and second electrical circuits, wherein an electrical ground of the first and second electrical circuits are electrically connected to the chassis, and wherein the chassis is configured to operate as a first portion of an antenna of the wireless transmitter;
a microphone comprising a housing, wherein the housing is configured to operate as an enclosure of the microphone and as a second portion of the antenna of the wireless transmitter; and
an electrical connector configured to enable communication, between the microphone and the wireless transmitter, of a combined RF signal comprising the first RF signal and the second RF signal.

19. The wireless microphone system of claim 18, further comprising:
a combining circuit having first and second ports operational only at the first and second frequency bands, respectively, and a third port operational at both the first and second frequency bands, wherein the first and second electrical circuits electrically connect to the first and second ports of the combining circuit, respectively, wherein the third port of the combining circuit electrically connects to a first component of the electrical connector, and wherein the first component of the electrical connector electrically connects to the housing of the microphone.

20. The wireless microphone system of claim 19, further comprising:
a matching circuit, wherein the third port of the combining circuit connects to the first component of the electrical connector through the matching circuit and provides a predetermined degree of impedance matching between the combining circuit and the antenna; and a control circuit configured to configure at least one electrically tunable element of the matching circuit based on an identity of the microphone, wherein the microphone is one of a plurality of different types of microphones.

21. The wireless microphone system of claim 18, wherein the antenna comprises a dipole antenna.

22. The wireless microphone system of claim 18, wherein the first and second electrical circuits are configured to operate simultaneously.

23. The wireless microphone system of claim 18, wherein the wireless transmitter is configured as a wireless transceiver for wireless transmission and wireless reception.

24. An antenna configured for operation at both a first frequency band and a second frequency band, wherein the antenna comprises:
   a chassis of a wireless apparatus, wherein the chassis supports a first portion of the antenna, and wherein the chassis is configured to accommodate:
      a first electrical circuit configured to process a first radio frequency (RF) signal within the first frequency band, wherein an electrical ground of the first electrical circuit is electrically connected to the chassis; and
      a second electrical circuit configured to process a second RF signal within the second frequency band, wherein an electrical ground of the second electrical circuit is electrically connected to the chassis;
   a housing of an electrical apparatus attached to the wireless apparatus, wherein the housing supports a second portion of the antenna; and
   an electrical connector configured to:
      electrically connect the wireless apparatus to the electrical apparatus; and
      communicate a combined RF signal comprising the first RF signal and the second RF signal.

25. The antenna of claim 24, further comprising:
   a combining circuit having first and second ports operational only at the first and second frequency bands, respectively, and a third port operational at both the first and second frequency bands,
   wherein the first and second electrical circuits are configured to electrically connect to the first and second ports of the combining circuit, respectively,
   wherein the third port of the combining circuit electrically connects to a first component of the electrical connector, and
   wherein the first component of the electrical connector electrically connects to the housing of the electrical apparatus.

26. The antenna of claim 25, further comprising:
   a matching circuit, wherein the third port of the combining circuit connects to the first component of the electrical connector through the matching circuit and provides a predetermined degree of impedance matching between the combining circuit and the antenna; and
   a control circuit configured to configure at least one electrically tunable element of the matching circuit based on an identity of the electrical apparatus, wherein the electrical apparatus is one of a plurality of different types of electrical apparatuses.

27. The antenna of claim 24, wherein the antenna comprises a dipole antenna.

28. The antenna of claim 24, wherein the first and second electrical circuits are configured to operate simultaneously.

29. The antenna of claim 24, wherein the wireless apparatus comprises a wireless transceiver configured for wireless transmission and wireless reception, and wherein the electrical apparatus comprises a microphone.

30. A wireless apparatus comprising:
   a chassis configured to operate as a first portion of an antenna;
   a first electrical circuit configured to process a first radio frequency (RF) signal within a first frequency band, wherein an electrical ground of the first electrical circuit is electrically connected to the chassis;
   a second electrical circuit configured to process a second RF signal within a second frequency band, wherein an electrical ground of the second electrical circuit is electrically connected to the chassis; and
   an electrical connector configured to:
      electrically connect the wireless apparatus to a microphone comprising a housing that is configured to operate as a second portion of the antenna; and
      communicate a combined RF signal comprising the first RF signal and the second RF signal.

31. The wireless apparatus of claim 30, further comprising:
   a combining circuit having first and second ports operational only at the first and second frequency bands, respectively, and a third port operational at both the first and second frequency bands,
   wherein the first and second electrical circuits electrically connect to the first and second ports of the combining circuit, respectively,
   wherein the third port of the combining circuit electrically connects to a first component of the electrical connector, and
   wherein the first component of the electrical connector is configured to electrically connect to the housing of the microphone.

32. The wireless apparatus of claim 31, further comprising:
   a matching circuit, wherein the third port of the combining circuit connects to the first component of the electrical connector through the matching circuit and provides a predetermined degree of impedance matching between the combining circuit and the antenna; and
   a control circuit configured to configure at least one electrically tunable element of the matching circuit based on an identity of the microphone, wherein the microphone is one of a plurality of different types of microphones.

33. The wireless apparatus of claim 30, wherein the antenna comprises a dipole antenna.

34. The wireless apparatus of claim 30, wherein the first and second electrical circuits are configured to operate simultaneously.

35. The wireless apparatus of claim 30, wherein the wireless apparatus comprises a wireless transceiver configured for wireless transmission and wireless reception.

* * * * *